United States Patent [19]

Farnsworth et al.

[11] Patent Number: 5,121,371
[45] Date of Patent: Jun. 9, 1992

[54] OPTICAL SERVO SYSTEM FOR MAGNETIC DISK

[75] Inventors: Stephen W. Farnsworth, Berthoud; Scott D. Wilson, Westminster, both of Colo.

[73] Assignee: Bernoulli Optical Systems Company, Boulder, Colo.

[21] Appl. No.: 539,625

[22] Filed: Jun. 18, 1990

[51] Int. Cl.⁵ .................. G11B 7/00; G01J 1/20; G02B 5/32
[52] U.S. Cl. ................. 369/44.26; 369/103; 369/109; 369/118; 250/201.5; 356/356; 359/15; 359/560
[58] Field of Search ........... 369/100, 103, 105, 109, 369/118, 13, 15, 44.26; 250/201.5; 356/356, 358; 350/162.17, 162.14, 3.7

[56] References Cited

U.S. PATENT DOCUMENTS

| | | | |
|---|---|---|---|
| 2,354,295 | 7/1944 | Albin | 369/105 |
| 3,971,002 | 7/1976 | Bricot et al. | 369/44.42 |
| 4,006,293 | 2/1977 | Bouwhuis et al. | 369/109 |
| 4,253,723 | 3/1981 | Kojima et al. | 369/44.42 |
| 4,525,826 | 6/1985 | Nakamura et al. | 369/109 |
| 4,545,044 | 10/1985 | Satoh et al. | 369/32 |
| 4,546,462 | 10/1985 | Koishi et al. | 369/54 |
| 4,800,547 | 1/1989 | Kessels et al. | 369/44.24 |
| 4,971,414 | 11/1990 | Funato et al. | 369/112 |

OTHER PUBLICATIONS

"An Introduction to the Insite 325 Floptical® Disk Drive", Jim Godwin, Insite Peripherals, Inc., presented at SPIE Optical Data Storage Topical Meeting (1989).

Primary Examiner—Roy N. Envall, Jr.
Assistant Examiner—Nabil Hindi
Attorney, Agent, or Firm—Woodcock Washburn Kurtz Mackiewicz & Norris

[57] ABSTRACT

Coherent light passing through slits produces an optical interference pattern having a fringe spacing related to the spacing of the servo tracks on a magnetic disk. The convolution of the interference pattern with the servo tracks generates a quadrature servo error signal.

24 Claims, 5 Drawing Sheets

FIG. 5
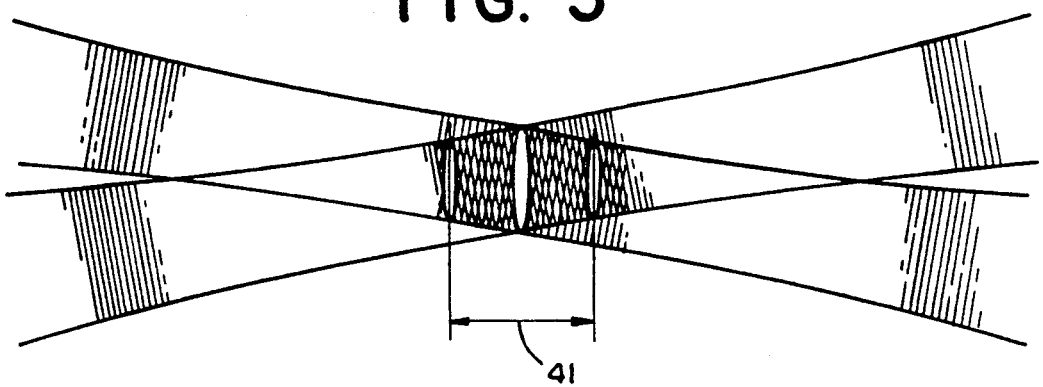
FIG. 6
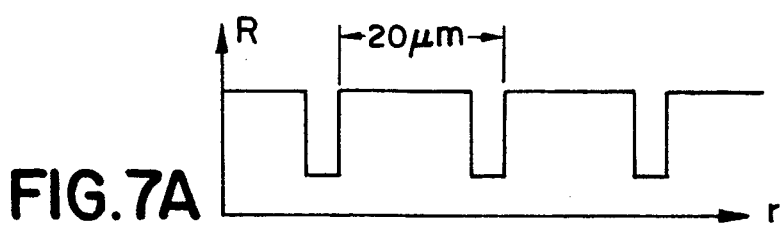
FIG. 7A
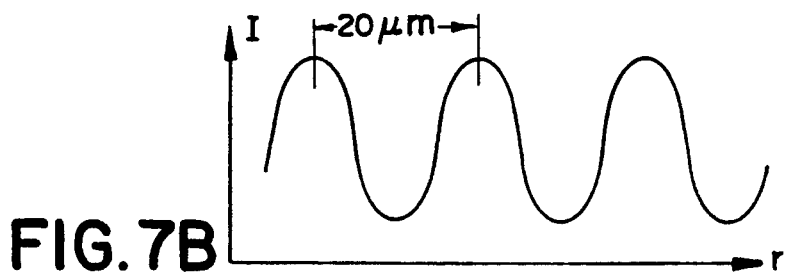
FIG. 7B

OPTICAL SERVO SYSTEM FOR MAGNETIC DISK

FIELD OF THE INVENTION

The present invention relates to information storage systems and more particularly to an optical sensor and a system for tracking the position of a head with respect to data tracks concentrically, or spirally, spaced about the rotational axis of a disk.

BACKGROUND OF THE INVENTION

The present emphasis in the development of information storage systems is the capability to store more and more information into a so-called "desk top" sized computer memory system. Those "desk top" sized memory systems which incorporate magnetically recorded hard disk media, such as that used in Winchester disk drive type memory systems, currently have the capacity to store upwards of 20 megabytes of magnetically recorded information. The problem with such memory systems is that by necessity the hard disk media is permanently mounted into the computer. Since the media is not easily removable, the use is limited to whatever portion of the hard disk is remaining for information storage at the of use. Accordingly, magnetically recorded hard disk media information storage systems are not viewed as a potential solution to increasing information storage capacity.

So-called "floppy" disk memory systems wherein flexible disks, each having a diameter of either 5.25 inches or 3.50 inches, are used as the storage media provides easily removable storage media. However, the problem with such storage systems is that the present storage capacity of information magnetically recorded on a single floppy disk used in such a system has not yet reached a level equal to that of the hard disk, i.e., a single floppy disk media can only store approximately 1 to 2 megabytes of magnetically recorded information.

Systems for storing information which can be accessed through optical devices have received significant attention due to their potential capacity to store substantially more data, i.e., on the order of 400 to 800 megabytes of information, than that available in either magnetically recorded hard disk or floppy disk storage systems.

The improved capacity of optical memory is obtained at a higher cost for the media, as well as for the drive when compared to magnetic memory devices. New advances in bariumferrite (BaFe) magnetic media allows bit densities to exceed optical bit densities. However, track densities of removable magnetic media are many times less than their optical counterparts.

A disk drive which uses an optical track sensing technique to determine the radial position of a magnetic head on a disk has been used to allow higher track densities. One such system is described in AN INTRODUCTION TO THE INSITE 325 FLOPTICAL® DISK DRIVE, Godwin, in a paper presented at the SPIE Optical Data Storage Topical Meeting (1989). This disk drive uses disks containing prewritten optical tracks with a 20 micron pitch. A light emitting diode illuminates the disk. The image of the disk's surface is transferred to a four-element photodetector by a lens and mirror. Such a system has the following drawbacks.

Because the INSITE head uses an L.E.D. as a diffused illumination source, light intensity at the disk, and subsequently on the detector, is very low. This creates a very low level tracking signal which must be greatly amplified electronically. Any system noise at this point also gets amplified and a signal with a high degree of undesired noise is obtained.

The INSITE head senses a very short segment of only two tracks. Since such a small area of the tracks is being detected, flaws in the disk such as small debris, scratches, roughness of the edges of the optical tracks, or even reflectivity variations all contribute to noise.

The head of the INSITE optical system creates a magnified image (5.5×) of the surface of the disk with a very short depth of focus (±6 μm). Because of this short depth of focus, the tracking signals degrade very quickly in the presence of shock, vibration, and thermal expansion within the head. INSITE includes a bi-metallic mechanism to compensate for thermal expansion and index of refraction changes within the optical system.

SUMMARY OF THE INVENTION

It is an object of the invention to provide a sensor and an optical tracking system which obviates the foregoing disadvantages in prior disk storage systems.

It is an object of the present invention to provide a magnetic disk storage system with a high track density made possible by using an optical track sensing system which is relatively insensitive to noise, shock, vibration and thermal expansion.

In accordance with the present invention, an optical interference pattern having a fringe spacing related to the spacing between the servo tracks is incident on the disk. A servo error signal which is the convolution of the interference pattern and the servo tracks is generated. This servo error signal controls the positioning of the magnetic head with respect to the data tracks.

The invention has the following advantages over prior optical tracking systems.

A high intensity spot is incident on the disk surface and re-imaged at the detector. This yields a much higher level tracking signal requiring less amplification. The resulting tracking signal has less noise when compared to the INSITE head, for example.

In the invention, the tracking signal is created by sensing a larger area of the disk. The pattern covers an area several tracks wide and several microns long. The reason for detecting a larger area of the disk is to reduce the noise caused by small flaws in the disk or edge roughness in the pre-written servo tracks. This is achieved by effectively averaging the tracking signal over several tracks on the disk at once. An extremely long depth of focus (greater than 1 mm) makes the system insensitive to disk axial runout, shock, vibration, thermal expansion and other thermal changes.

The foregoing and other objects, features and advantages of the invention will be better understood from the following more detailed description of a particular embodiment.

DESCRIPTION OF THE DRAWINGS

FIG. 5 is an exaggerated enlargement of the interference pattern;

FIG. 6 depicts the optical interference pattern in relation to the servo track;

FIG. 7A depicts the reflectivity of the servo tracks as a function of disk radius;

FIG. 7B depicts the light intensity of the optical interference pattern as a function of disk radius;

DESCRIPTION OF THE PREFERRED EMBODIMENT

Figure 1:
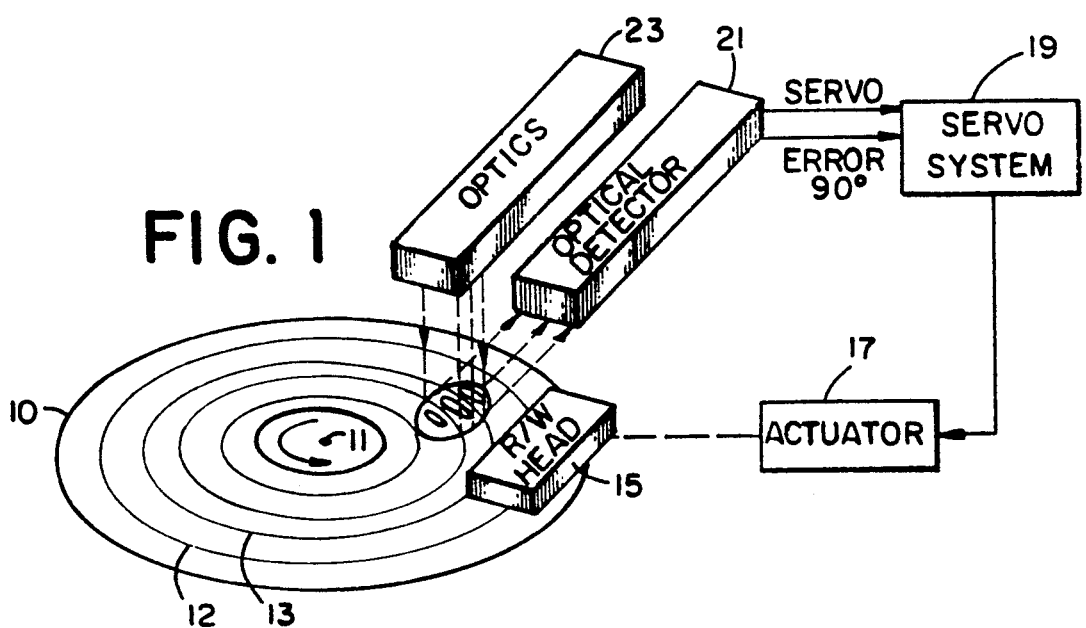
FIG. 1 depicts a disk storage system and an optical tracking system in accordance with the present invention.

FIG. 1 shows a magnetic disk storage system for reading data from or writing data to a removable disk surface 10 having a rotational axis 11 and a plurality of data tracks. Servo tracks 12, 13 and others form an optical pattern concentrically recorded with said data tracks. Alternatively, the servo tracks may be a spiral pattern.

The disk is rotated about its axis 11 by a drive which is not shown. A read/write head 15 is positioned adjacent to the disk surface for reading or writing. An actuator 17 positions head 15 with respect to the disk surface. A servo system 19 controls actuator 17. The servo system is responsive to a servo error signal generated by the optical detector 21.

In accordance with the present invention, an optical interference pattern is generated by the optics 23 which is mounted rigidly with read/write head 15. The interference pattern is incident on the servo tracks of the disk immediately next to head 15. The reflected light is the convolution of the interference pattern and the pre-recorded servo tracks. This light is detected by the optical detector 21 to produce the servo error signal.

Figure 2:
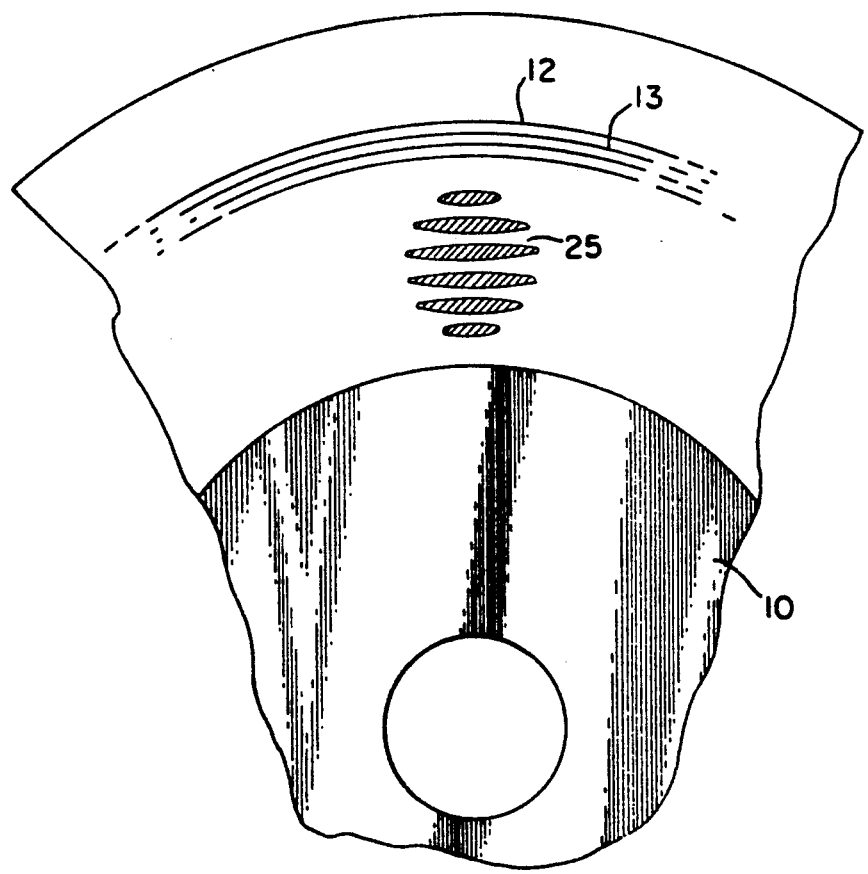
FIG. 2 shows a portion of a disk with the pattern of the servo tracks and the interference pattern thereon.

FIG. 2 depicts a portion of magnetic disk 10. The prerecorded servo tracks are shown at 12 and 13. The optical interference pattern 25 has fringes which have a spacing approximately equal to the spacing of the servo tracks.

Figure 3:
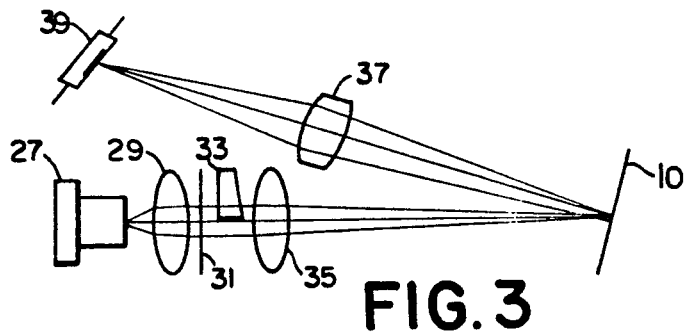
FIG. 3 shows a layout of the tracking system of the present invention.

Referring to FIG. 3, a low power 780 nm laser diode 27 emits coherent light which is gathered by the collecting lens 29. An aperture plate 31 has two slits producing two crossed beams of coherent light. A prism 33 splits the laser beam in the direction orthogonal to the two interfering beams. Prism 33 covers half of the light passing through each slit. Prism 33 rotates half of the beam slightly so that two interference patterns appear in the focal plane of the lens 35. The spots of coherent light are incident upon the disk 10. Incident light is convolved with the pre-recorded optical pattern of the servo tracks on the disk 10. The reflected light is imaged by imaging lens 37 on the binary cell photodetector 39. The two cells detect the two reflected light patterns to produce quadrature signals which are used as the servo error signal.

Figure 4:
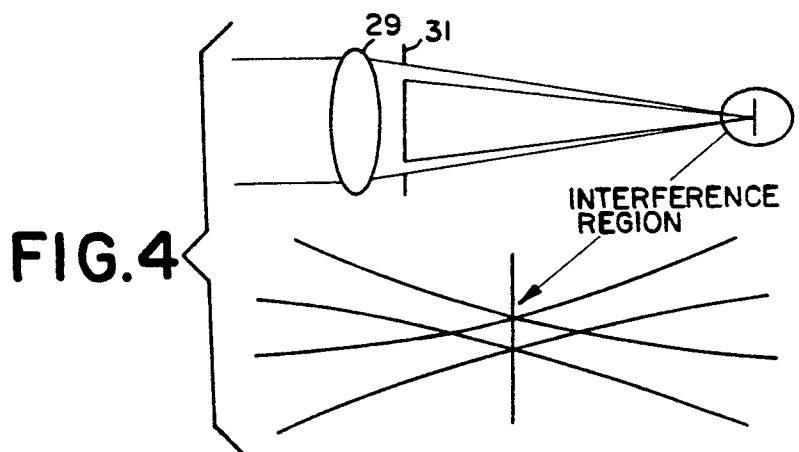
FIG. 4 shows the two slits producing an interference pattern.

As shown in FIG. 4, light passing through spot-forming lens 35 is split into two paths of light by the aperture plate 31. An interference pattern of several cycles is created at the focal plane of the lens system. The spatial frequency of the interference pattern is determined by the relative angle of the two crossed beams.

The optical components in the invention can include or be mostly replaced by a multi-zoned Holographic Optical Element ("HOE"), or a multi-zoned replicated optic. The first described embodiment includes a collimator lens, a pair of slits, a prism, and (for the return beam path) a collector lens. All four of these devices or some subset of them can be replaced by either a HOE or an all refractive multi-element array of similar format. Fabricators of such custom HOE's are able to computer-generate and E-beam etch surface relief patterns for replication, and utilize "blazing" as in diffraction gratings to increase light efficiency.

Figure 3A:
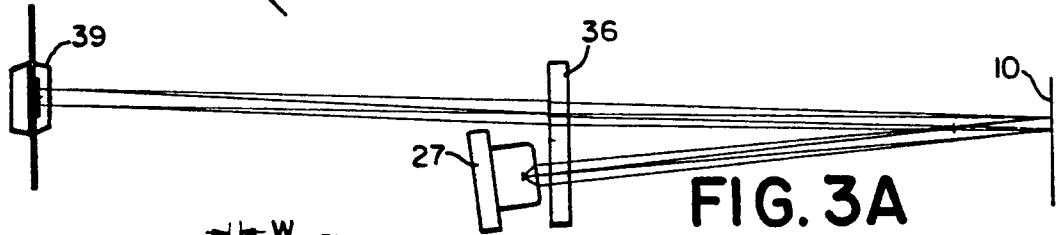
FIG. 3A shows the HOE implementation.

FIG. 3A shows an embodiment in which HOE 36 replaces the lenses, slits and prism of FIG. 3.

Note that a surface embossed hologram with "blaze" is really a cross-over technology device, wherein refraction and diffraction both are used to direct light paths. It combines the function of a Fresnel lens (all refractive) and non-blazed holograms which work strictly by diffraction. Embodiments including the discrete optical devices or the multi-element combinations whether refractive, diffractive, or in combination (i.e., "blazed hologram") are all within the scope of the invention.

In the specific embodiment being described, the slit spacing and lens focal length are selected to provide a 2.2° beam angle using a wavelength of 780 nm. As an example, the pitch, i.e., the spacing between the data tracks and the spacing between the servo tracks is approximately 20 microns. In this example, an interference pattern having several cycles of fringes is produced with a spacing between the fringes which is equal to the pitch of the data and servo tracks. A multiple of the relationship between fringe spacing and pitch of the tracks can be used.

Figure 4A:
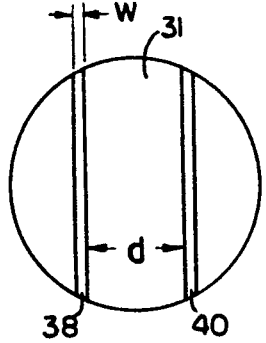
FIG. 4A depicts the width and spacing of the slits.

FIG. 4A depicts the slits 38 and 40 in the aperture plate 31. The slits have a width w and a spacing d.

Figure 4B:
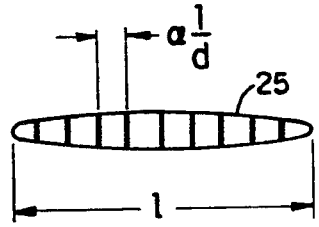
FIG. 4B shows the relationship between the interference pattern and the with and spacing of the slits.

FIG. 4B depicts the relationship between the fringes of the interference pattern and the width and spacing of the aperture plate. The length l of the interference pattern approximates the inverse of the width w of the slits and the spacing between the fringes approximates the inverse of the distance d between the slits.

FIG. 5 shows the interference region enlarged and exaggerated to show the advantage of the present invention. An interference pattern is produced throughout the region which has been denoted 41. Because the pattern exists throughout this region, there is no need to focus the light on the disk surface. Rather, as long as the disk surface is in the region 41, the proper interference pattern is incident upon the optical tracks. This long depth of focus, which is about 1 mm in the embodiment being discussed, makes the system insensitive to disk axial runout, shock, vibration, thermal expansion and other thermal changes and relaxes manufacturing tolerances. The overlap zone of the two beams is where the interference pattern exists. The three ellipses point out the extent of the overlap (and hence of the interference pattern) for 3 different focal positions.

FIG. 6 depicts the interference pattern 25 produced by the slits in relation to the pre-recorded optical pattern formed by the servo tracks.

FIG. 7A depicts the reflectivity R of the servo tracks as a function of the radius of the disk.

FIG. 7B shows the intensity I of the optical interference pattern as a function of disk radius r. When the light of the optical interference pattern is reflected from the disk surface, the reflected light is the convolution of incident light intensity and reflectivity of the servo tracks. This is specified by the well-known convolution integral:

$$\int_o^s \int_o^t I(s-x, t-y) \cdot R(x,y) \, dx \, dy$$

While the reflection of light has been shown in the specific embodiment, light could be transmitted through the disk. Similarly, the result will be the convolution of the intensity of incident light with the servo pattern. In this case, it is the transmissivity of the medium, rather than the reflectivity, which is convolved with the incident light.

Figure 8A:
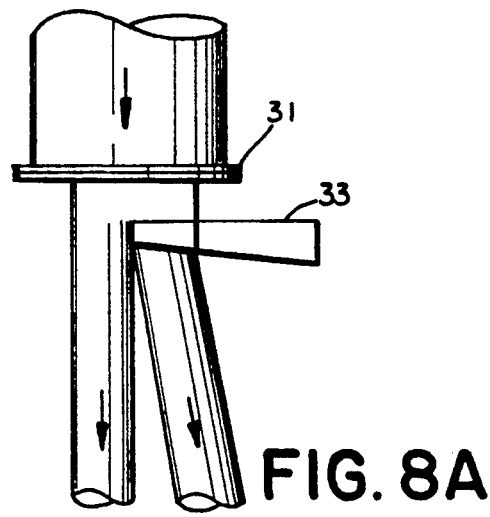
FIG. 8 and 8A depict the prism breaking the optical interference pattern into two optical patterns.
Figure 8:
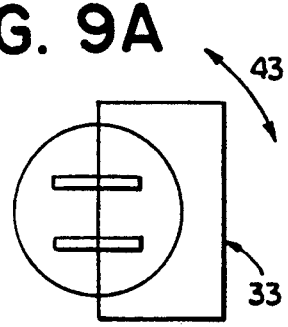

FIG. 8 shows how the prism 33 splits the interference pattern into two spots. Prism 33 covers half of the light passing through each slit. Prism 33 is rotated slightly in the direction indicated by arrow 43 to move one of the spots in the cross track, or radial, direction in order to change its phase relative to the first spot. The prism is adjusted to achieve a 90° phase shift and locked in place. In the embodiment under consideration, less than approximately one degree of rotation is required to achieve a 90° phase shift.

FIG. 8A shows the wedge cross-section of prism 33 and the beam bending action. This shows how the prism alters the location of one spot.

Figure 9:
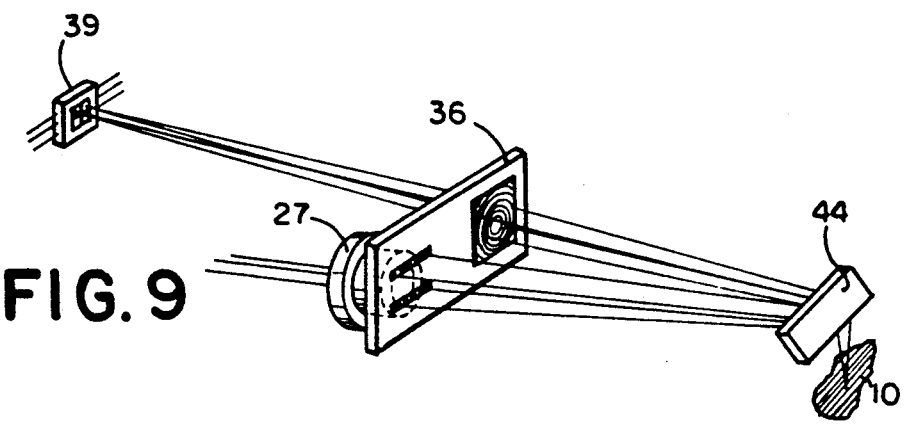
FIG. 9 and 9A show the HOE implementation in more detail.
Figure 9A:
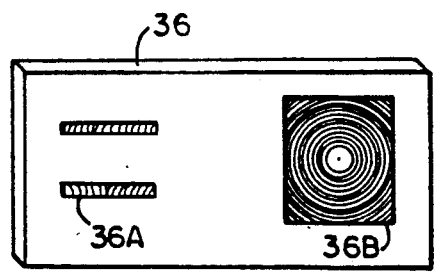

FIGS. 9 and 9A show the holographic implementation in more detail. The HOE 36 has an area 36A which replaces lens 29, slits 31, prism 33 and lens 35. The area 36B replaces the lens 37. FIG. 9 also shows the mirror 44 directing light onto the surface of media 10 and back to detector 39.

Figure 10A:
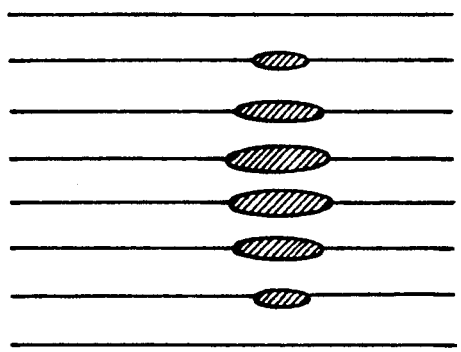
FIGS. 10A and 10B depict the two reflected optical patterns.
Figure 10B:
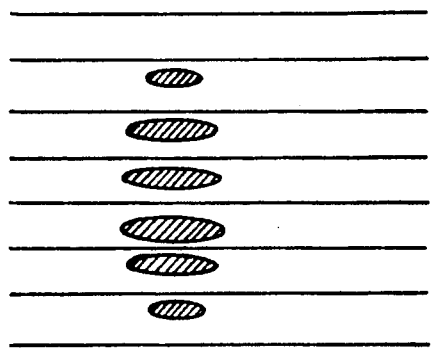

FIGS. 10A and 10B depict the two interference patterns which are 90° out of phase with respect to a cycle of the servo tracks.

Figure 11A:
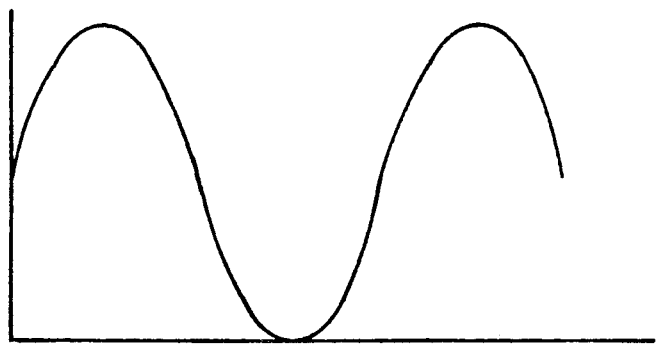
FIGS. 11A and 11B depict the quadrature servo error signals generated by the binary cell photodetector.
Figure 11B:
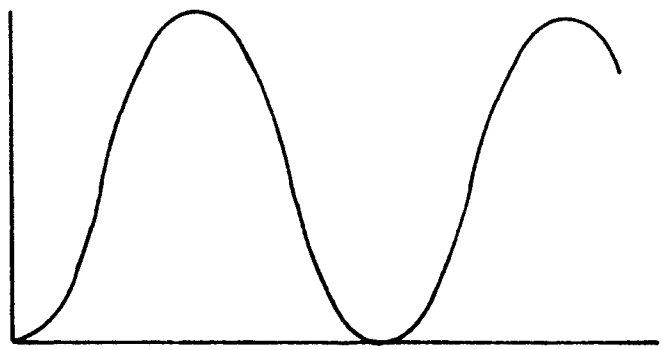

FIG. 11A depicts the sinusoidal signal produced by the photodetector as a function of distance in the radial direction. FIG. 11B depicts the other output of the photodetector which is a sinusoidal signal 90° out of phase with respect to the first signal. These two signals form a quadrature servo error signal which is used in a servo system in a manner known in the art.

The optical head device of the invention can be used with a grating or ruling of the type used in linear position encoders. This is accomplished by making the optical channel "dual channel," projecting pairs of spots both onto the media disk and also onto a ruling pattern fixed inside the mechanism acting as a stationary reference scale. The same optical head collects the return light beams from both channels and produces two sets of position signals, for: a) position relative to the media disk data tracks, and b) for position relative to the drive's main framework, i.e., in terms of absolute radius from the spindle center. In this way, the same system provides both the capability of tracking the laser marked media or behaving as a conventional floppy disk drive in positioning by absolute radius from the spindle. The benefit is that with this dual channel detection system plus a dual transducer magnetic head (wide and narrow track) the drive can be made "downward compatible", that is, can be made to read and write both the new (e.g., 20 MByte) and the old (e.g., 1.4 MByte) media.

Figure 12:
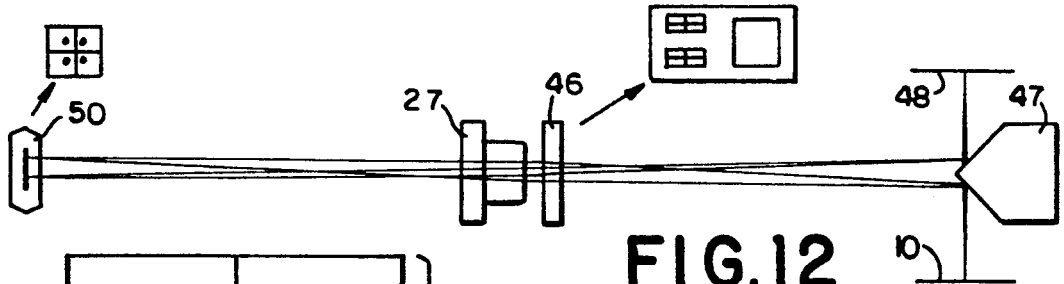
FIG. 12 shows an alternate embodiment with an optical encoder.

FIG. 12 shows such a two channel system. HOE 46 projects four spots which are reflected from mirror 47 onto the disk surface 10 and onto the fixed-scale surface 48 which is like a linear encoder. The reflected light, two spots from disk 10 and two spots from fixed scale surface 48, are re-imaged on the four elements of a quadrant photodetector 50, often referred to as a "quad cell photodetector."

Figure 12A:
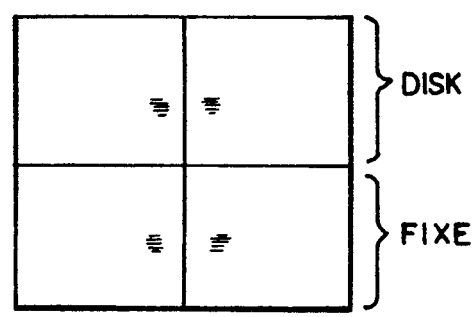
FIG. 12A depicts the quad cell photodetector of FIG. 12.

FIG. 12A depicts the four spots incident on the quad cell photodetector 50. The top two spots are reflected from the disk with one of the spots being 90 out of phase with the other. The bottom two spots are reflected from the fixed scale surface 48 with one spot being 90° out of phase with the other.

The second set of slits to make the second set of spots for the fixed scale surface 48 is positioned at closer spacing than the first, in what was in the single channel embodiment the opaque dead zone between slits, and utilizing light which was wasted before. Note that fringe spacing is inversely proportional to the slit spacing, so the second channel spots have a larger fringe spacing. The spacing is picked to be related to the standard track pitch of the old floppy format so the second channel can be used for locating to that format. A ruled grating of pitch matching the fringe spacing is generated and mounted parallel to the media, aligned parallel to the carriage travel. The optical head directs the two pairs of beams at slightly different angles to get slight vertical separation at the surface of the turn mirror 47. The turn mirror for this version is "delta shaped", having two facets to turn one pair of beams up and the other down—one to the disk, the other to the fixed scale.

"Differential Read" or "Common Mode Rejection" can be achieved in accordance with the invention. For each pair of spots giving quadrature signals in the embodiments described to this point, we can generate instead 4 spots, each 90° of phase apart; now the signals are paired and differenced, to give two quadrature signals with the "dc" component subtracted out. The reflectivity variations and light level variations are much less of a signal processing problem. A much simpler AGC, if any, is required.

While particular embodiments of the invention has been shown and described, various modifications are within the true spirit and scope of the invention. The appended claims are, therefore, intended to cover all such modifications.

What is claimed is:

1. In a disk storage system for reading data from or writing data to a disk surface having a rotational axis and a plurality of data tracks about the rotational axis including:

means for rotating said disk surface about the rotational axis;

a head positioned adjacent to the disk surface for read and/or writing data from said tracks;

means for positioning said head with respect to said disk surface; and a servo system for controlling said means for positioning, said servo system being responsive to a servo error signal;

the improvement comprising:

pre-recorded optical servo tracks for indicating the radial position of said head with respect to said disk;

means for producing an optical interference pattern having a fringe spacing related to the spacing of said servo tracks, said interference pattern having a length which extends over several of said servo tracks;

said interference pattern being incident upon said servo tracks; and means for generating said servo error signal which is the convolution of said interference pattern and said servo tracks.

2. The system recited in claim 1 wherein said servo tracks are pre-recorded concentrically with said data tracks.

3. The system recited in claim 1 wherein said fringe spacing is equal to the pitch of said servo tracks.

4. The system recited in claim 1 wherein said interference pattern is reflected from said servo tracks, said system further comprising:

an optical detector, the reflected light being incident on said detector to produce said servo error signal.

5. The system recited in claim 1 further comprising:
means for generating two optical interference patterns, one out of phase with the other.

6. The system recited in claim 5 and a binary cell photodetector, said two optical interference patterns being convolved with the servo tracks on said disk, one of the convolved optical patterns being incident on one of the binary cells of said photodetector to produce said servo error signal, the other of the convolved optical patterns being incident on the other of the binary cells to produce a quadrature servo error signal.

7. The system recited in claim 6 wherein said interference pattern is divided into two independent beams with a small angular difference therebetween to create two separate interference patterns at the focal plane.

8. The system recited in claim 7 wherein said angular difference is produced by:

a wedge prism dividing the beam in a direction nearly orthogonal to that of the optical interference, the reflected image of said two interference patterns being focused onto two cells of said detector resulting in said quadrature signal.

9. The system recited in claim 7 wherein said angular difference is produced by:

a holographic optical element dividing the beam in a direction nearly orthogonal to that of the optical interference, the reflected image of said two interference patterns being focused onto two cells of said detector resulting in said quadrature signal.

10. The system recited in claim 4 further comprising a collecting lens for focusing reflected light on said detector.

11. The system recited in claim 1 wherein said means for producing an interference pattern includes a coherent light source.

12. The system recited in claim 11 further comprising an aperture plate containing two slits producing two crossed beams of coherent light.

13. The system recited in claim 12 and an imaging lens, or HOE, wherein the spacing between said two slits and the imaging lens focal length or HOE focal length determines the relative angle between said two beams, the spatial frequency of said interference pattern being determined by said relative angle.

14. The system recited in claim 13 wherein said slit spacing and the focal length of said imaging lens are selected to produce a beam angle of approximately 2.2° at a wavelength of about 780 nm to achieve fringe spacing of approximately 20 μm.

15. The system recited in claim 1 wherein said means for producing an optical interference pattern is a holographic optical element.

16. The system recited in claim 1 wherein said servo tracks are pre-recorded on said disk further comprising:
a fixed grating;
means for generating another optical interference pattern, said other optical interference pattern being incident upon said fixed grating; and
a multiple cell detector producing a signal responsive to light incident upon said servo tracks and another signal responsive to light incident upon said fixed grating.

17. The system recited in claim 15 further comprising:
means for generating two further optical interference patterns, each being out of phase with the first recited two interference patterns; and
a quadrant photodetector producing quadrature signals for each pair of interference patterns, said signals being differenced to provide two quadrature signals without a dc component.

18. An optical tracking servo system for a disk storage system in which information is read form or written to a plurality of data tracks about the rotational axis of the disk by a head comprising:

optical servo tracks pre-recorded in relation to said data tracks for indicating the radial position of said head with respect to said disk;

means for producing an optical interference pattern having a fringe spacing related to the spacing of said servo tracks, said interference pattern having a length which extends over several of said servo tracks;

said optical interference pattern being incident upon said servo tracks;

means for imaging said interference pattern on said servo tracks; and means for generating a servo error signal which is the convolution of said interference pattern and said servo tracks.

19. The system recited in claim 18 further comprising:
means for generating a second optical interference pattern, said second optical interference pattern being out of phase with the first recited optical interference pattern, both of said interference patterns being imaged on said disk surface.

20. The system recited in claim 19 and a binary cell detector, said first and second optical interference patterns being convolved with the servo tracks on said disk, the convolved optical patterns being incident on the binary cells of said photodetector to produce said servo error signal and a quadrature servo error signal.

21. The system recited in claim 18 further comprising:
means for dividing said interference pattern into two independent beams with a small angular difference therebetween to create two separate interference patterns at the focal plane.

22. The system recited in claim 21 wherein said means for dividing said interference pattern comprises:
a wedge prism dividing the beam in a direction nearly orthogonal to that of the optical interference, the convolved image of said two interference patterns being focused onto two cells of said detector resulting in said servo error signal and a quadrature servo error signal.

23. The system recited in claim 18 wherein said means for producing an interference pattern includes a coherent light source and an aperture plate containing two slits producing two crossed beams of light.

24. The system recited in claim 23 and an imaging lens wherein the spacing between said two slits and the lens focal length determines the relative angle between said two beams, the spatial frequency of said interference pattern being determined by said relative angle.

* * * * *